(No Model.)
E. M. WOOD.
DEVICE FOR HANDLING EGGS.
No. 283,738. Patented Aug. 21, 1883.
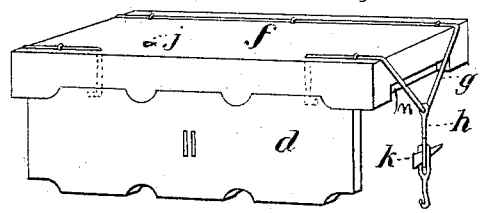
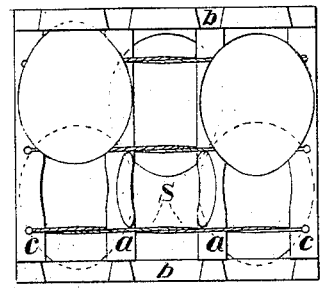
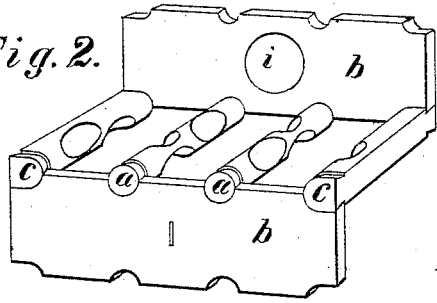
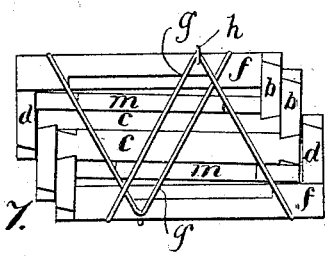
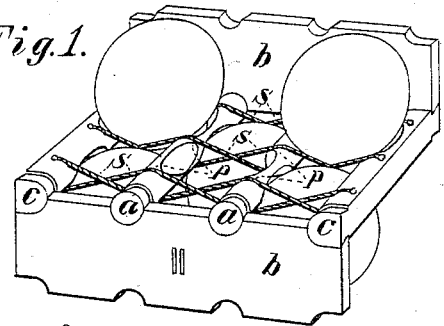
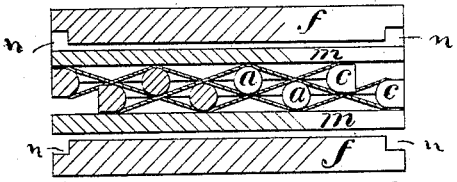
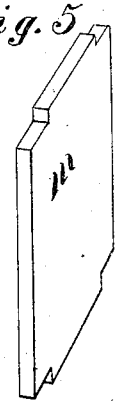
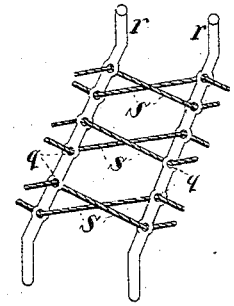
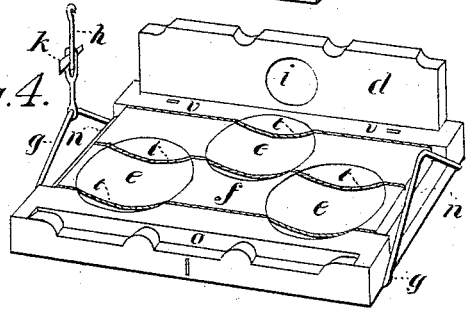
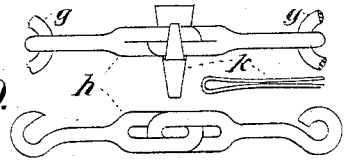
Witnesses,
James B. Martindale
Barton W. S. Martindale
Inventor,
Emery M. Wood

UNITED STATES PATENT OFFICE.

EMERY M. WOOD, OF CHICAGO, ILLINOIS.

DEVICE FOR HANDLING EGGS.

SPECIFICATION forming part of Letters Patent No. 283,738, dated August 21, 1883.

Application filed July 5, 1883. (No model.)

*To all whom it may concern:*

Be it known that I, EMERY M. WOOD, a citizen of the United States, residing at Chicago, in the county of Cook and State of Illinois, have invented a new and useful Device for Handling Eggs and other Merchandise, of which the following is a specification.

My invention relates to improvements in a set of trays to rest upon one another when filled and to fall within and around one another when empty. As my device is more especially intended for handling eggs, the drawings and description are confined to trays for eggs; but I do not limit its use to handling of eggs exclusively.

The objects of my improvements are, first, to facilitate the first filling of the trays; second, to adapt them for the instant transfer of eggs from tray to tray; third, to secure compactness in the grouping of the eggs; fourth, to secure a special and material reduction in bulk of the device when out of use; fifth, to provide safeguards against the breakage of the eggs in carrying; sixth, to preclude all damage from exposure to rain; and, seventh, to facilitate the handling of eggs in receiving, shipping, and delivering, and also in inspecting, turning over, and taking stock of eggs in store. I attain these objects by the mechanism illustrated in the accompanying drawings, in which—

Figure 1 is a carrying-tray with two eggs placed thereon and three other eggs in position beneath. Fig. 2 is a storing-tray. Figs. 3 and 4 are covers, and Fig. 5 one of the two side or end boards for a set of carrying-trays. Fig. 6 is a top view of Fig. 1. Fig. 7 is an end elevation, and Fig. 8 a vertical section, of a carrying-case when empty and folded. Fig. 9 is another form of combining supporting-rods and twines for a diaphragm of a carrying-tray, and Fig. 10 is an enlarged front and side view of the tightening-hook and key for clamping together a carrying-case.

Similar letters refer to similar parts throughout the several views.

The essential features of my invention are shown in Fig. 1.

The trays, Figs. 1 and 2, are simple rigid frames or racks composed of the parallel supporting-rods $a\,a\,c\,c$, with spaces between for but a single row of eggs, secured at opposite ends to one edge of the two vertical side rims or slats $b\,b$, said edge being in the same plane with the axes of the rods, and rims $b\,b$ extending vertically in opposite directions, one wholly upward, the other wholly downward, from said plane. The other edges of rims $b\,b$ have notches to receive the rod ends of other trays, made dovetail in form to prevent the trays from sliding upon each other. By this arrangement a set of trays are adapted to interlock with one another, resting upon the rims when filled, and also, when empty and thrown off the rims, to fall within and around each other, the rims $b\,b$ falling beside each other, as shown in Fig. 7, and the rods falling between each other, as shown at Fig. 8.

To make the tray a carrying-tray, twines diposed in pairs, $s\,s\,s$, Fig. 1, placed one and one-quarter inch apart, are interwoven with rods $a\,a\,c\,c$ from end to end of the tray in such a manner as to touch each other midway between the rods, thence diverging vertically from each other, one passing over while the other passes under each successive rod. Thus are formed a series of short double elastic saddles of twine, spanning all the spaces at regular intervals, each saddle presenting an angular opening upward and another downward. Into these angles of twine the eggs naturally roll of themselves when placed upon the tray, the eggs lying horizontal with axes parallel to the rods, each egg extending across two of the saddles, and when covered by another tray each egg is securely clasped between four of the saddles, making it impossible for it to come into contact with anything but the elastic twines. To the end rods, $c\,c$, only are the twines made fast. Across the intermediate rods, $a\,a$, they rest in loose retaining-notches $p\,p$, leaving the saddles free to render twine to each other to the limited extent required for suiting the varying sizes of the eggs, so that small and large eggs alike are kept from erring by the same degree of resistance. The tension of the twines $s\,s\,s$ should be no greater than barely sufficient to straighten the spans. Being so short between supports, they serve their purpose equally well and cannot get out of place if quite loose. The reductions in thickness of the rods $a\,a\,c\,c$ at points between the saddles shown in Fig. 1 are not in any manner essential to the combination of the rods and twines, and I claim it without them, as shown at *a c*, Fig. 8. Another form of the combination of the rods and twines is shown at Fig. 9, in which the twines *s s s*, instead of diverging vertically over and under the rods, diverge horizontally along the rods, passing through loose retaining-holes *q q* in the supporting-rods *r r*, which are represented as made of wire, with the opposite ends bent upward and downward, to be driven into side slats similar to *b b*, Fig. 1; but the form shown at Fig. 1 is the preferable one, because more easily made and not liable to rust. The reductions in thickness of rods *a a* (shown in Figs. 1 and 2) are simply an expedient to secure compactness in the mass of eggs. They are formed by equal cuttings from two opposite sides, only leaving the thin central wall in width equal to the whole diameter of the rod, which thus retains sufficient strength, while enabled to pass through the limited spaces between the successive pairs of eggs above and below it, and for this purpose the walls, taken consecutively upon the same rod, must be turned at right angles to each other about the axis of the rod, and in the tray they must all incline at an angle of about forty-five degrees to the common plane of the rods, as shown.

The cover-trays, Figs. 3 and 4, consist of a single side rim, *d*, firmly nailed to one end of the solid board *f*, into which are bored the egg-cavities *e e e*, loosely spanned by the single twines *t t t*, retained by being pressed into saw-kerfs across board *f*. It has recesses *o* to interlock with trays, and recesses *n n* to interlock with end boards, in Fig. 5, which are plain boards, with offsets at top and bottom to enter recesses *n n* of the covers. The rigid angular bails *g g*, Figs. 3 and 4, may be formed of a single piece of wire, crossing the back of the cover at the side, having no rim, and at the opposite side may pass through board *f* and be bent short upon the inside, as shown at *v v*, Fig. 4. To one bail of each cover is attached a tightening-hook, *h*, formed in two parts, joined together by narrow elongated links. When hooked into the bail of the opposite cover, an opening appears through both links, which opening is increased in length by forcing into it the wedge-shaped key *k*, thereby shortening and tightening hook *h*. Key *k* is a piece of thick tin or sheet-iron tapered from the middle to the ends and bent double. When pressed into the links tight, the key has the outer prong bent back upon and around the links to clinch the fastening, all as shown in Fig. 10. Bails *g g* are to be just long enough to extend from top to bottom of case when empty and folded, as shown at Fig. 7, and hooks *h h* are then tightened up after being hooked into small eyelets of wire at the back of the covers, of which one is shown at *j*, Fig. 3. The circles *i i*, Figs. 2 and 4, are dish-shaped cavities bored into slats *b* and *d*, to clear the small ends of eggs in each alternate row, thereby reducing the width of the trays, as illustrated in Fig. 6.

Comparing Figs. 1 and 2 with reference to the relative position of the egg-seats, it will be seen that these two trays are mutual, fitting each other when filled with eggs. Two trays exactly like Fig. 1 would not thus fit each other, neither would Fig. 2 fit upon Fig. 4. This necessitates the distinction of odd and even trays in every set, which is indicated by the Roman numerals I and II on the front of the respective figures.

By reference to Figs. 1 and 6 it will be seen that the mass of eggs in a set of my trays is almost as dense as it could be without the intervention of cushioned supports. It is by the means there shown for isolating eggs thus grouped that I attain the compactness desirable, making my thirty-dozen case but one-half the size of those now in use.

The manner of using my device is as follows: To transfer eggs, as from Fig. 1 to Fig. 2, place the latter upon the former and turn them together upside down. In case of two even trays, first transfer to an odd tray and thence to the even.

The storing-tray, Fig. 2, is for the store-room and for hotels, restaurants, private houses, &c., where it is filled by transfer from the carrying-trays of the dealer; also, at the producer's, eggs are collected in the storing-trays and thence transferred to the carrying-trays of the dealer.

In filling trays by hand, where dispatch is desirable, use a pair of twined trays, as follows: Place the eggs upon one of them by the handfuls, using both hands till full, leaving the eggs to arrange themselves, which they will ordinarily do sufficiently. Then bring down upon them with a gentle swinging motion the other twined tray. The refractory eggs, if any, being elevated, are caught in the saddles of the upper tray and shoved gently to place. The twines pressing each egg at eight different and opposing points, on pressing the trays together with perhaps a slight jar, all the eggs are instantly polarized with axes parallel to the rods. Then, observing whether the first tray to be filled be odd or even, if odd, turn uppermost the odd tray of the pair, exchange it for the tray to be filled, transfer, and proceed as before. Thus eggs are easily and rapidly placed in my trays, and, once there, they can be piled in vast quantities in the least possible space, and in a shape admitting of their being moved about, turned over, inspected, transferred, shipped, and delivered without any further manipulation or counting of the eggs themselves, and with the same ease and dispatch as could so many potatoes.

As egg-cases have heretofore been proposed consisting of separate sections or trays fitting upon each other, I do not claim such an arrangement, broadly.

As devices have heretofore been proposed intended to utilize the elastic resistance of strained cords when forced from straight lines, as cushion-supports for eggs in a carrying-case, I do not claim that idea in the abstract as novel in my device.

Cases crossed by parallel battens presenting mutually-confronting notches for the reception of eggs or fruit having heretofore been proposed, I do not claim that arrangement as a part of my invention.

What I claim as my invention, and desire to secure by Letters Patent, is—

1. In a tray for eggs or other merchandise, the supporting and inclosing rims $b\,b$, extending vertically and wholly in opposite directions from the bottom or diaphragm of the tray, substantially as described and shown.

2. A series of zigzag trays, Figs. 1 and 2, adapted by their invert rims $b\,b$ equally to set upon each other, resting upon the rims, with a space for merchandise between, and to fall into and around each other without such space, substantially as shown and described.

3. A tray for eggs or other bodies, consisting of parallel rods $a\,a\,c\,c$, separated by spaces sufficient for but a single row of eggs or other bodies, and rigidly joined to invert rims $b\,b$, substantially as described and shown.

4. In a diaphragm or partition for an egg-tray or other goods-case, fixed parallel supporting-rods $a\,a\,c\,c$, with loose retaining-notches $p\,p$, in combination with intersecting and vertically-diverging twines $s\,s\,s$, interwoven with said rods, substantially as described and shown.

5. In a tray for eggs or other bodies, partition-rods $a\,a$, Figs. 1 and 2, reduced at intervals to thin central walls, consecutively turned at right angles to each other about the axis of the rod, substantially as described and shown.

6. Jointed hook $h$, in combination with wedge-key $k$, substantially as described and shown.

EMERY M. WOOD.

Witnesses:
 JAMES B. MARTINDALE,
 BARTON W. S. MARTINDALE.